United States Patent
Hagg et al.

(10) Patent No.: US 9,171,001 B2
(45) Date of Patent: Oct. 27, 2015

(54) PERSONALIZED PLAYLIST ARRANGEMENT AND STREAM SELECTION

(75) Inventors: Wilhelm Hagg, Korb (DE); Jana Eggink, London (GB)

(73) Assignee: SONY Corporation, Tokyo (JP)

( * ) Notice: Subject to any disclaimer, the term of this patent is extended or adjusted under 35 U.S.C. 154(b) by 888 days.

(21) Appl. No.: 13/329,708

(22) Filed: Dec. 19, 2011

(65) Prior Publication Data

US 2012/0185070 A1  Jul. 19, 2012

(30) Foreign Application Priority Data

Jan. 5, 2011 (EP) .................................... 11000054

(51) Int. Cl.
*G06F 17/00* (2006.01)
*G06F 17/30* (2006.01)
*G11B 27/10* (2006.01)

(52) U.S. Cl.
CPC ........ *G06F 17/30053* (2013.01); *G11B 27/105* (2013.01); *G06F 17/30743* (2013.01); *G06F 17/30755* (2013.01)

(58) Field of Classification Search
CPC .................. G06F 17/30743; G06F 17/30749; G06F 17/30752; G06F 17/30755; G06F 17/30761; G06F 17/30764; G06F 17/30778; G06F 17/30766; G06F 3/16; G06F 3/162; G06F 3/165; G06F 3/167; G06F 17/3074; G06F 17/3005; G06F 17/30053
USPC ............ 700/94; 381/56, 61; 84/601, 604, 609
See application file for complete search history.

(56) References Cited

U.S. PATENT DOCUMENTS

| | | | |
|---|---|---|---|
| 6,526,411 B1 * | 2/2003 | Ward | ..................... 1/1 |
| 7,028,082 B1 | 4/2006 | Rosenberg et al. | |
| 2004/0158860 A1 | 8/2004 | Crow | |
| 2005/0038819 A1 * | 2/2005 | Hicken et al. | .............. 707/104.1 |
| 2005/0071370 A1 * | 3/2005 | Altschul et al. | ............ 707/104.1 |
| 2006/0224260 A1 * | 10/2006 | Hicken et al. | ................... 700/94 |
| 2006/0265421 A1 | 11/2006 | Ranasinghe et al. | |
| 2008/0215173 A1 * | 9/2008 | Hicken et al. | ................... 700/94 |
| 2008/0294277 A1 * | 11/2008 | Hicken et al. | ................... 700/94 |

(Continued)

FOREIGN PATENT DOCUMENTS

WO    WO 2009/090358 A1    7/2009

OTHER PUBLICATIONS

Ning-Han Liu, et al., "Adaptive Music Recommendation Based on User Behavior in Time Slot", IJCSNS International Journal of Computer Science and Network Security, vol. 9, No. 2, Feb. 2009, pp. 219-227.

*Primary Examiner* — Xu Mei
(74) *Attorney, Agent, or Firm* — Oblon, McClelland, Maier & Neustadt, L.L.P.

(57) ABSTRACT

Method for determining a sequence of audio pieces, comprising receiving a set of audio pieces, and determining the sequence of audio pieces by arranging audio pieces from the set in an order; wherein a position of a respective audio piece within the order is determined based on a user's personal profile, the user's personal profile includes rules descriptive of the user's preferences, the rules relating to attributes including meta data attributes and/or acoustic parameters of audio pieces, and wherein the position of the respective audio piece is determined depending on one of the attributes of the respective audio piece according to one of the rules.

20 Claims, 12 Drawing Sheets

(56) References Cited

U.S. PATENT DOCUMENTS

| | | | |
|---|---|---|---|
| 2009/0012635 A1* | 1/2009 | Hicken et al. | 700/94 |
| 2009/0061764 A1* | 3/2009 | Lockhart et al. | 455/3.06 |
| 2009/0177967 A1 | 7/2009 | Moore et al. | |
| 2012/0042245 A1* | 2/2012 | Askey et al. | 715/716 |

* cited by examiner

PERSONALIZED PLAYLIST ARRANGEMENT AND STREAM SELECTION

BACKGROUND

An embodiment of the invention relates to a method for determining a sequence of audio pieces. Further embodiments relate to a music playback device and to a system for personalized playlist arrangement and stream selection.

Nowadays, a multitude of large music databases exist, and it is known to provide users with music pieces selected in accordance with their likings. Supposing however that not only the selected music pieces, but also a manner of arranging the music pieces has an influence upon a user's acceptance, there is a need for methods for arranging playlists or streams for enhancing the user's pleasure and agreement.

It is therefore an object of the invention to provide a method for arranging a given set of audio pieces so as to enhance a user's pleasure with and agreement to the arrangement.

This object is solved by a method, a music playback device and server according to the independent claims.

Further details of the invention will become apparent from the consideration of the drawings and the ensuing description.

BRIEF DESCRIPTION OF THE SERVERAL VIEWS OF THE DRAWINGS

The accompanying drawings are included to provide a further understanding of embodiments and are incorporated in and constitute a part of this specification. The drawings illustrate embodiments, and together with the description serve to explain principles of the embodiments. Other embodiments and many of the intended advantages of the embodiments will readily be appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note that all described embodiments may be combined in any way, i.e. that there is no limitation that certain described embodiments may not be combined with others. Further, it should be noted that same reference signs throughout the Figures denote same or similar elements.

It is further to be understood that other embodiments may be utilized, and structural or logical changes may be made without departing from the scope of the invention. The following detailed description therefore is not to be taken in a limiting sense, and the scope of the present invention is defined by the appended claims. It is further to be understood that the features of the various embodiments described herein may be combined with each other, unless specifically noted otherwise.

Figure 1:
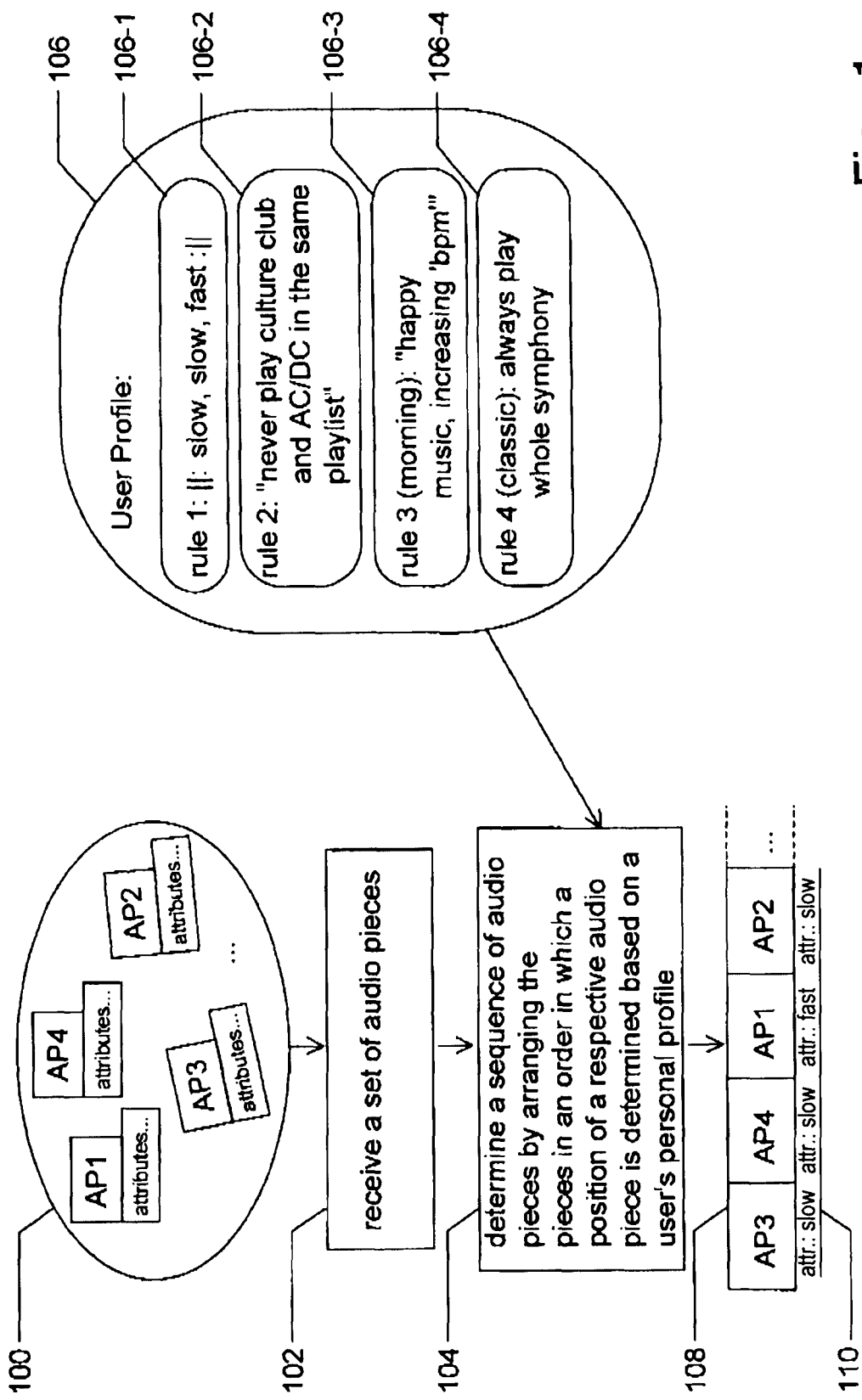
FIG. 1 illustrates an embodiment of a method for determining a sequence of audio pieces based on a user profile including a plurality of rules.

In FIG. 1, an embodiment of method for determining a sequence of audio pieces is illustrated. At 100, a set of audio pieces AP1, AP2, AP3 and AP4 is provided.

The audio pieces may include any kind of audio data. For example, the audio pieces may include pieces of music which may be adapted to be played out to a user e.g. on a music playback device. The audio pieces may include songs, concerts, musical compositions or other musical works, but also audio data including speech or sound.

The audio pieces may be stored on any kind of data storage, such as for example a remotely accessible or locally stored music data base, or from a storage medium which may have been purchased by the user such as a compact disc, or from a storage medium with an individual registration such as a memory stick ™ provided e.g. by another user. The audio pieces may also be collected from a multitude of data storages, e.g. from multiple data bases. The set of audio pieces may or may not be provided as an ordered list, e.g. as a playlist or a music data stream.

Further, as illustrated at 100, the audio pieces may also include attributes related to the audio pieces. The attributes may include metadata attributes descriptive of the respective audio piece, indicating for example an artist, a song name, a genre, an instrumentation, or a mood of the audio piece. Further, the attributes may include acoustic parameters descriptive of acoustical features of the respective audio piece, such as an average beat per minute, a spectrum of frequencies, or the like.

The attributes may be stored together with the audio pieces within the data storage. Alternatively or in addition, the attributes may also be retrieved from another storage medium, e.g. if requesting meta data attributes from a remote music data base for locally stored audio pieces.

At 102, set of audio pieces 100 is received, e.g. since having been retrieved from any of the above mentioned data storages, or since having been provided e.g. by a server.

At 104, audio pieces AP1 to AP4 of set of audio pieces 100 are arranged in an order. In the order, a position of a respective audio piece is determined based on a user profile 106, as will be described in detail in the following. From the order results a sequence 108 of audio pieces, which may for example be presented, i.e. played out, to the user.

User profile 106 constitutes the user's personal profile, describing likings, inclinations and/or preferences of the user at least with respect to music, i.e. aspects of his musical taste. User profile 106 may include one or more rules 106-1, 106-2, 106-3 and 106-4 descriptive of the user's preferences, i.e. of various aspects of his likings.

Rules 106-1, 106-2, 106-3 and 106-4 as shown in FIG. 1 may relate to the attributes, e.g. the metadata attributes and/or the acoustic parameters. In FIG. 1, rule 106-1 relates to a tempo of audio piece to be arranged and describes a preferred pattern of tempi, i.e. describes the user's preference for a repetition of the pattern "slow, slow, fast" within a musical arrangement. Thus, from rule 106-1 it may be derived that a sequence of audio pieces following the pattern "slow, slow, fast" with repeated application may be particularly preferred by user, e.g. if compared to any other arrangement. Rule 106-2 refers to the metadatum artist and indicates that the user may not like playlists including songs of "Culture Club" and "AC/DC". Rule 106-3 is marked to be applied in the morning, e.g. should only be applied when arranging a playlist to be played in the morning, and indicates the user's preference for happy music with an increasing average beat per minute (bpm), which may be adapted to wake up and cheer up the user in the morning. Contrasting to this, rule 4 is marked to only be applied to classical music and indicates that when playing audio pieces from a symphony, the whole symphony should be played at once.

As may be seen from this example, the rules may relate to all kinds of attributes of metadata and/or acoustic parameters. Further, the rules may also relate to combinations of the attributes, for example if it is to be defined that "songs with a high bpm should always be rock'n roll of the 60s". Further, any kind of syntax and semantic may be used for formulating the rules. However, for applying the method depicted in FIG. 1 in an automatic manner, it may be preferable to choose a machine-interpretable language for describing the rules.

Further, the user's personal profile may include sub-profiles relating to e.g. a time of day, a mood of the user (such as happy, sad, active, calm, or cheerful), to an activity of the user (wake up, way to work, concentrating, cool down), or to a situation surrounding the user (driving, in the bus, . . . ).

Indication for a sub-profile to a which a rule is to be assigned may for example be taken from a user feedback to his playlists, such as a time of day at which the playlist is regularly heard, or a mood which has been manually assigned to the playlist for requesting the playlist to be played at a later point in time just by indicating the mood (playlist with attribute "sad" may be played whenever the user indicates being sad). Further, the rules may also be assigned to a type of music. For example, rule 106-4 may only be applicable to/recognized for playlists including classical music, and may therefore be assigned to classical music, and thus only be applied when rearranging a playlist of classical music.

In the embodiment, sequence 108 of audio pieces AP1 to AP4 is determined such that a position of a respective audio piece is determined depending on one of the attributes of the respective audio piece, and further determined in accordance with one of the rules of user profile 106. In the example, audio pieces AP1 to AP4 have been arranged in an order AP3, AP4, AP1, AP2 in which the attribute "tempo" of the audio pieces AP3, AP4, AP1, AP2 follows rule 106-1 of user profile 106, forming a repeated sequence with instances "slow, slow, fast" of this attribute.

It should be noted that in the example, the attribute "tempo" may be derived from the acoustic parameter "beat per minute (BPM)" e.g. by classifying ranges of the acoustic parameter as slow, medium, fast, very fast, and so on.

Due to the arrangement of audio pieces AP1 to AP4 with respect to user profile 106, it may be assumed that sequence 108 will be particularly suited to meet the user's tastes, and therefore be particularly appreciated by the user. As a consequence, it is possible to arrange playlists not only in accordance with global rules, but to provide a personalized arrangement of audio pieces suiting the user's taste.

Consequently, even if audio pieces of corresponding or same content are recommended to two different users, these audio pieces may, for each of the users, be arranged in a personalized sequence reflecting the individual taste of each user in accordance with the user's profile. Thus, the two playlists arranged for the two distinct users may differ in their order of arrangement. For example, the first user might prefer a large amount of dissimilarity between individual songs to avoid boredom. The respective playlist may then start with one of the fast songs, may continue with one of the slow songs, may then present a change in instrumentation, and further with the next piece a change in artist, and so on. The second user may, however, prefer very little dissimilarity between the individual songs to achieve smooth transitions. In this case, the playlist may start, for example, with the slow songs and arrange the following songs consecutively by minimizing dissimilarity and perhaps by matching rhythmical transition. Thus, even though enjoying the same content, each of the users will achieve a different arrangement adapted to suit his or her personal taste, and may therefore particularly appreciate the sequence of audio pieces presented to him or her.

As can be seen from FIG. 1, one of the rules included in user profile 106 may include a first pattern of attributes, the first pattern describing a preference in arrangement of the user, as described in the above. Thus, the first pattern of attributes may also be referred to as a "preference pattern". In the case depicted, a pattern of the attribute "tempo" is included in rule 106-1, and may be used as the first pattern/preference pattern.

Further in FIG. 1, audio pieces AP1 to AP4 are arranged such that the attributes of the audio pieces arranged within sequence 108 form and/or realize a second pattern. The second pattern may therefore also be referred to as a realization pattern.

As shown in the example depicted, sequence 108 may be determined such that the second pattern (realization pattern) essentially matches the first pattern (preference pattern). This may be achieved for example by successively selecting one of audio pieces AP1 to AP4 from set 100 with respect to its attribute, i.e. such that the attributes of successively selected songs match the preference pattern.

The matching of the patterns may be judged in a strict manner, e.g. such that any sequence 108 not strictly following the preference pattern 106-1 may be excluded and not be presented to the user. Further, the matching may also be judged in a less strict manner. For example, a respective difference between the average beats per minute of a respective audio piece and a required range of beats per minute characterized by the preference pattern may be calculated, and a sum of squares of such differences may be calculated. On this basis, a sequence minimizing such difference may be selected as sequence 108 and be presented to the user.

Figure 2:
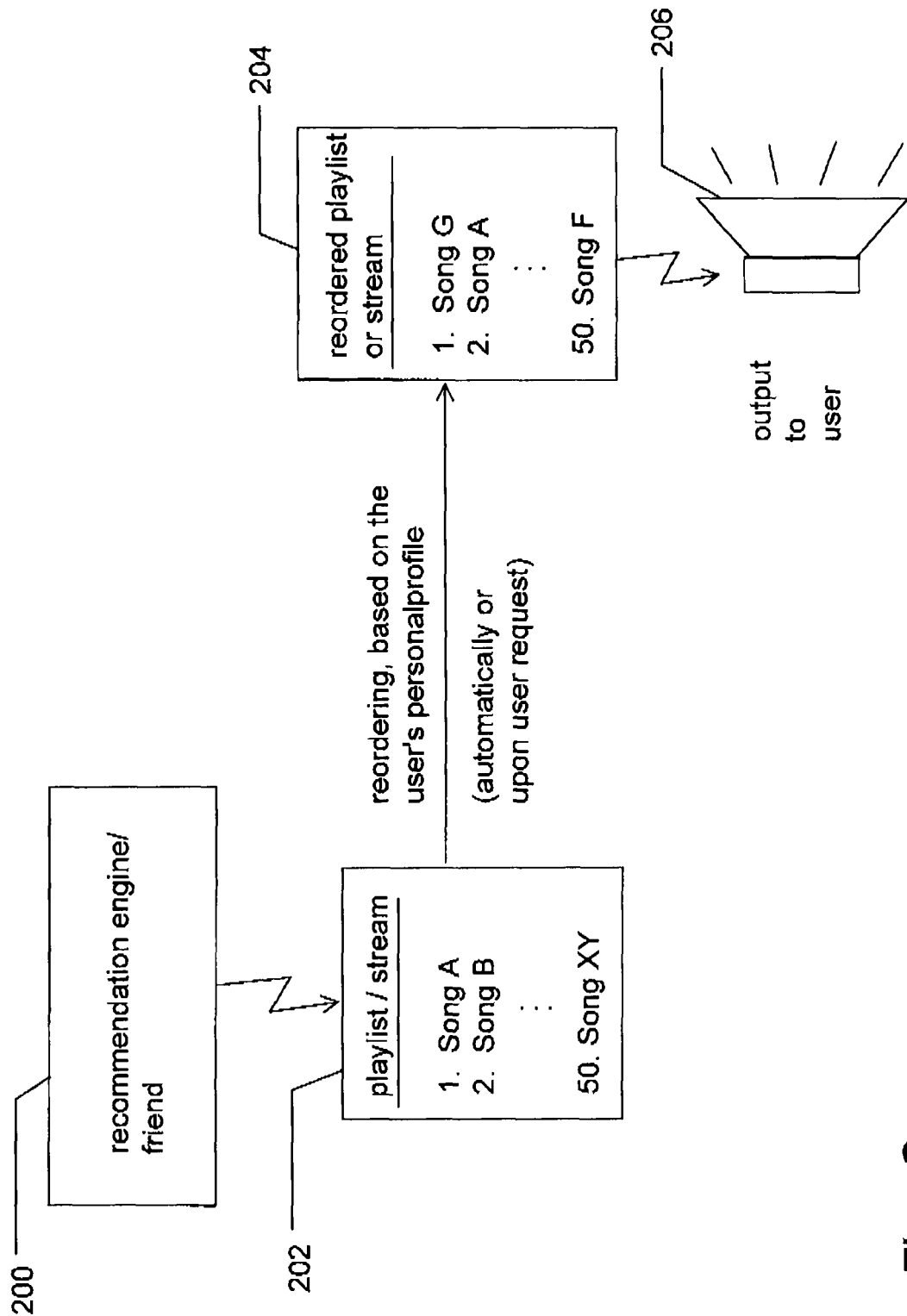
FIG. 2 illustrates an embodiment of a method for determining a sequence of audio pieces, which method is carried out automatically or upon user's request.

FIG. 2 shows a further example of an embodiment of the method. Following the example, a recommendation engine or friend 200 may propose or send a playlist or stream 202 of songs A, B, XY. Before outputting playlist or stream 200 to the user, a reordering is performed based on the user's personal profile, thereby obtaining a reordered playlist or stream 204 including songs G, A, . . . , F in that particular order. The reordered playlist or stream may then be output to the user at 206.

In this embodiment, the reordering may be performed in accordance with the embodiment of the method depicted in FIG. 1. Thus, playlist/stream 202 may correspond to set of audio pieces 100, reordered playlist or stream 204 may correspond to sequence 108, and the user's personal profile may correspond to user profile 106 including rules 106-1 to 106-4. Thus, a playlist or stream which may be expected to be particularly enjoyable for the user may be generated.

It should be noted that the reordering may be performed automatically or upon the user's request. If the reordering is performed automatically, the user may not even be aware of the reordering, but will however be particularly satisfied since the reordered playlist or stream may particularly suit his preferences.

Contrasting to this, if the reordering is performed upon the user's request, the user may compare playlist/stream 202 with reordered playlist or stream 204 and thus positively recognize the additional value of the reordering. In this case, the functionality provided by the embodiment of the method may be recognized as being valuable, thereby influencing the user's further choice of his favorite music provider, audio playback device, audio playback system or the like.

Figure 3:
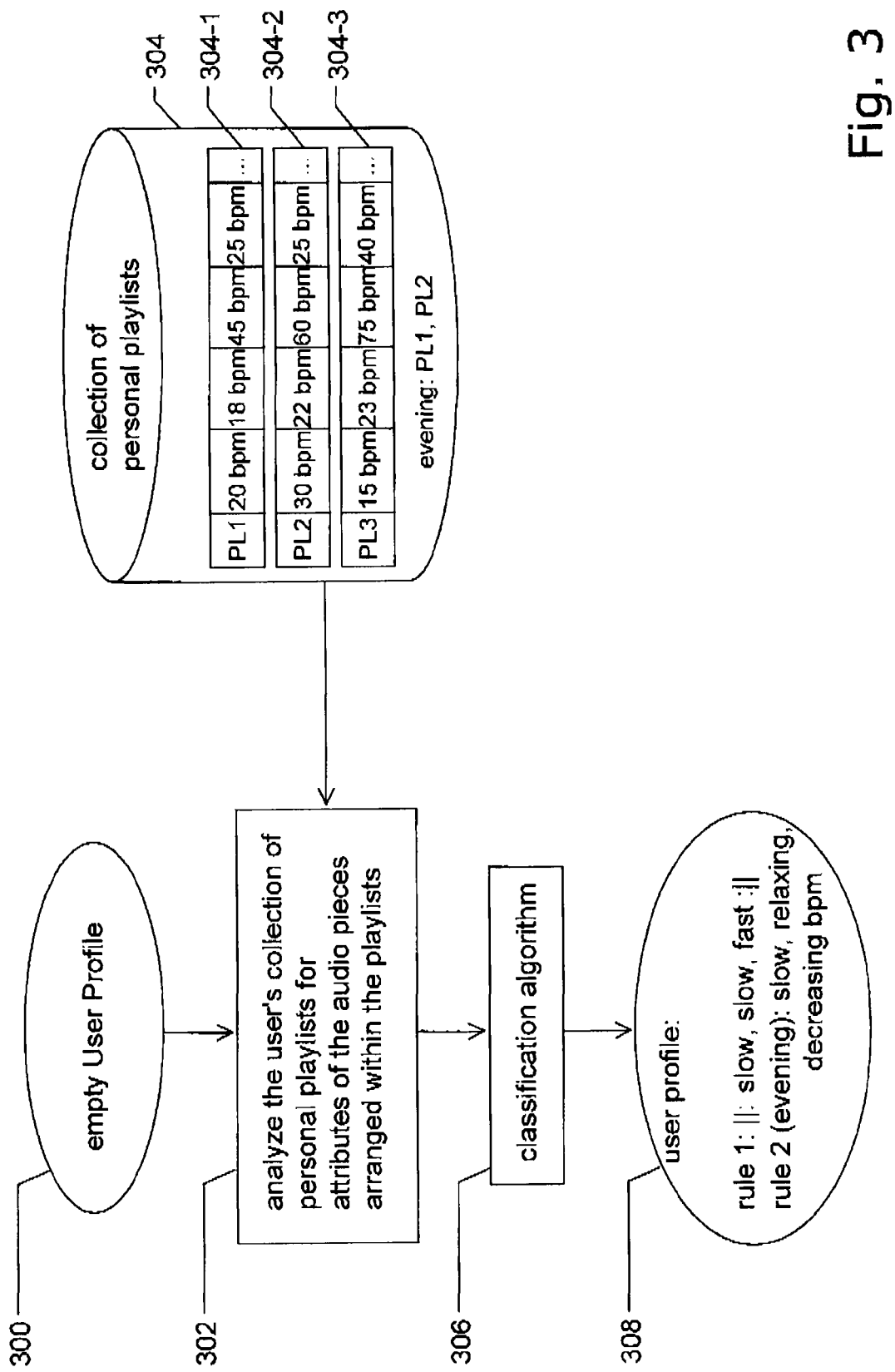
FIG. 3 illustrates an embodiment of a method for determining a user profile based on a collection of personal playlists.

In FIG. 3, an embodiment of a method for user profile generation is depicted. The embodiment may be based on an empty user profile 300, and may start at 302 with analyzing the user's collection 304 of personal playlists 304-1, 304-2, 304-3 for attributes of the audio pieces arranged within the playlists.

In the example, playlist 304-1 starts with four consecutively arranged audio pieces having a respective average beat per minute of 20 bpm, 18 bpm, 45 bpm and 25 bpm. This sequence of instances of the attribute "average beat per minute" may be analyzed, together with corresponding sequences derived from playlists 304-2 and 304-3, by a classification algorithm. The classification algorithm may for example be particularly suited for pattern recognition, e.g. for recognizing patterns frequently occurring within in collection 304.

The patterns may be analyzed with respect to one single attribute, e.g. one single meta datum or acoustic parameter, or with respect to plural attributes, e.g. represented by a vector of attributes. For example, the classification algorithm may recognize that a large part of the playlists start with a fast and appealing rock song, but then continue with more soft songs having a soft instrumentation and singing voice. Thus, it may be recognised that it is preferred that a playlist may start with one rock song followed by at least one and up to three ballads. Further, the classification algorithm may note that particular groups of artists are often included in one single playlist, while never mixed with other artists. Further, classification algorithm 306 may also analyze further attributes assigned with a whole playlist, e.g. a mood in which the playlist is preferred or a time of day at which the playlist has often been played back to the user.

All kinds of attribute evaluations, classification algorithms and pattern recognition algorithms may be used and combined for deriving characteristic patterns from collection 304. For example, firstly attributes of the audio pieces may be derived, e.g. calculated or recalled from an external meta data base. Then, ranges of attributed may be defined for obtaining classes, e.g. classifying a song having an average beat per minute between 25 and 40 as "slow". Then, a pattern recognition algorithm may be applied, grouping the instances of attributes and classes to vectors and analyzing the instances for frequently occurring patterns.

In the example, classification algorithm 306 has derived from collection 304 a first rule that the user prefers a repeated pattern of "slow, slow, fast" realized by consecutively arranged audio pieces, and further a second rule that in the evening, the user prefers slow and relaxing music arranged in an order with substantially decreasing average beat per minute.

Thus, starting from e.g. empty user profile 300, an acquired user profile 308 may be defined e.g. by including several rules derived from collection 304. Alternatively, the embodiment of the method may also start with a predefined user profile and analyze further playlists e.g. newly added to collection 304. The predefined profile and its rules may then be amended, e.g. refined, with respect to the rules derived from the attributes of the further playlists. Acquired user profile 308 thus depends on collection 304 including at least one sequence 304-1 of audio pieces, e.g. on the attributes of the audio pieces arranged within playlist 304-1 of collection 304. Thus, a user's personal collection of playlists may form a rich basis for deriving rules and patterns of preferred arrangement schemes.

Figure 4:
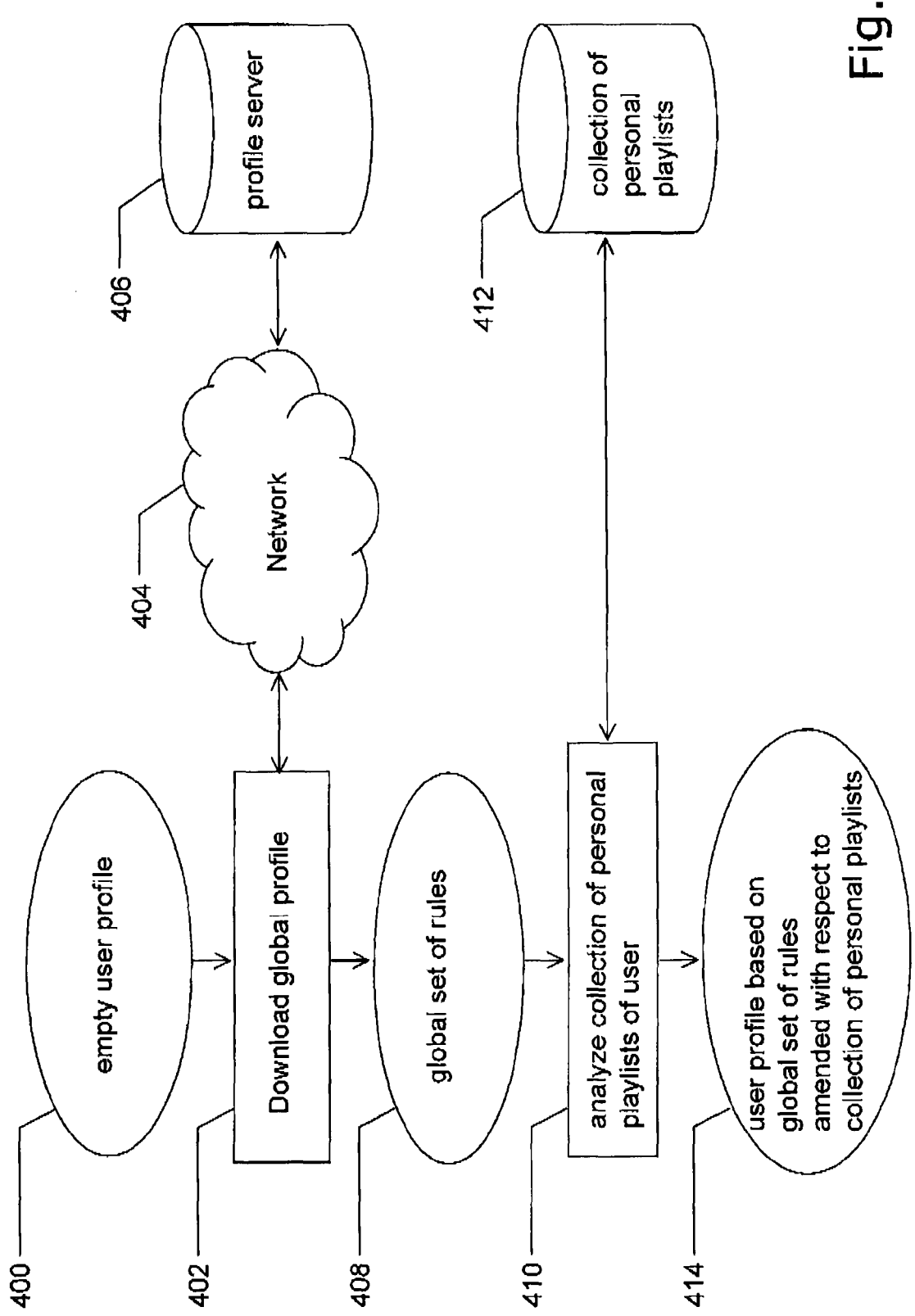
FIG. 4 illustrates a method in which a user profile is determined based on a global set of rules, which set is amended with respect to a collection of personal playlists.

Further, as illustrated in FIG. 4, the user's personal profile, e.g. user profile 106, may also be determined by adapting a global profile depending on at least one sequence of audio pieces, e.g. included in collection 304. In the example, a further empty user profile 400 is updated by a download 402 of a global profile over a network 404 from a profile server 406.

The global profile may include a global set of rules 408, e.g. successful patterns of arrangement of a population of users. The global profile may have been obtained by analyzing personal arrangements of users of the population or by analyzing "successful" playlists which have been positively ranked by these users. Thus, a popularity based profile suiting most user's tastes may be provided as the global profile.

After having downloaded the global profile, global set of rules 408 may further be refined with respect to the user's individual arrangement preferences. For example, a collection 412 of the user's personal playlists may be analyzed at 410. An analysis of collection 412 may include similar steps as the embodiment explained with respect to FIG. 3. Thus, classification algorithm 306 may also be used for analyzing collection 412 for deriving further rules suiting the taste of the user.

The refinement of global set of rules 408 with respect to these further rules may be performed in any way, i.e. by adding the rules suiting the personal taste of the user to global set of rules 408, or by amending global set of rules 408 based on the personal rules e.g. by applying logical operations or by adapting and refining the patterns.

As a result, a further acquired user profile 414 based on global set of rules 408 and amended with respect to collection 412 is achieved. The further acquired user profile 414 on the one hand follows successful patterns of the popularity of users, but on the other hand also respects the personal tastes of the user. Thus, since departing from a global profile, a reasonable and well appreciated user profile may even be derived in situations where only a limited amount of user data is available, e.g. if collection 412 only includes very few personal playlists.

Figure 5:
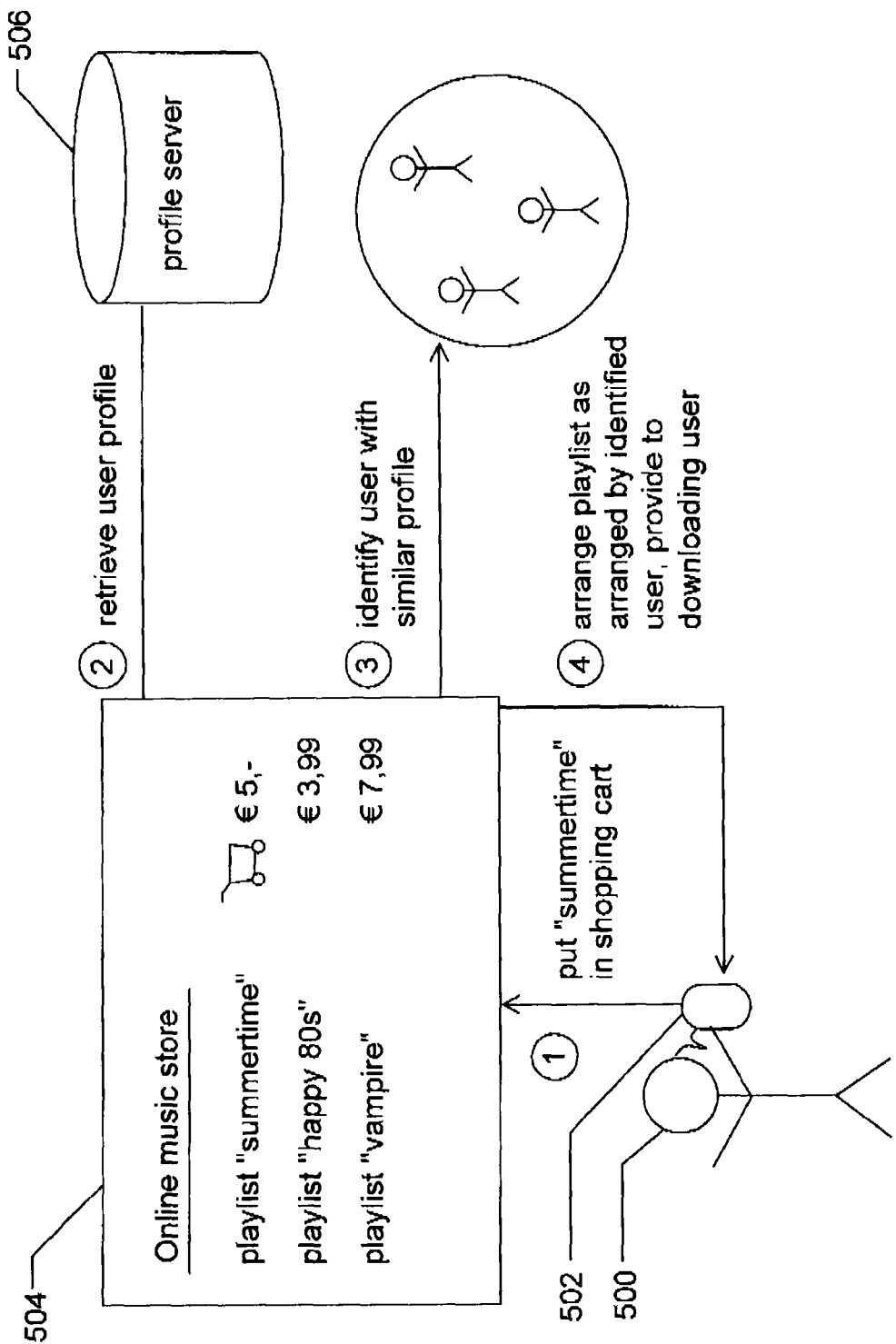
FIG. 5 illustrates a method for determining a sequence of audio pieces in accordance with a user's preferences, which method is based on collaborative filtering techniques.

In FIG. 5, a further embodiment of the method is illustrated which is based on a collaborative filtering technique. In a first step, a user 500 having a music download and playback device 502 accesses an online music store 504 e.g. via a network. In the example, online music store 504 offers three different playlists, the first of which the user puts into his virtual shopping cart. Upon this requests, a second step of retrieving a user profile of user 500 is initiated by online music store 504, e.g. by accessing a profile server 506. Based on the user profile of user 500, a further user from a population of users may be identified in a third step, the further user having a similar user profile. For example, all users that have bought the same playlist may be included in the population. In a fourth step, the playlist may be arranged corresponding to an arrangement of this playlist by the further user. This arrangement may then be provided to user 500.

It should be noted that in this example, user 500 may not even note that the playlist he or she has purchased has been rearranged. Further, it should be noted that no arrangement algorithm is needed at the side of online music store 504. This is due to the fact that the user profile of user 500 is only needed for identifying the further user having the similar profile, and that the arrangement of the further user may be used without any further adaption. Thus, with very little processing steps, the playlist may be adapted to the preferences of user 500 and may thus particularly satisfy his needs.

Figure 6:
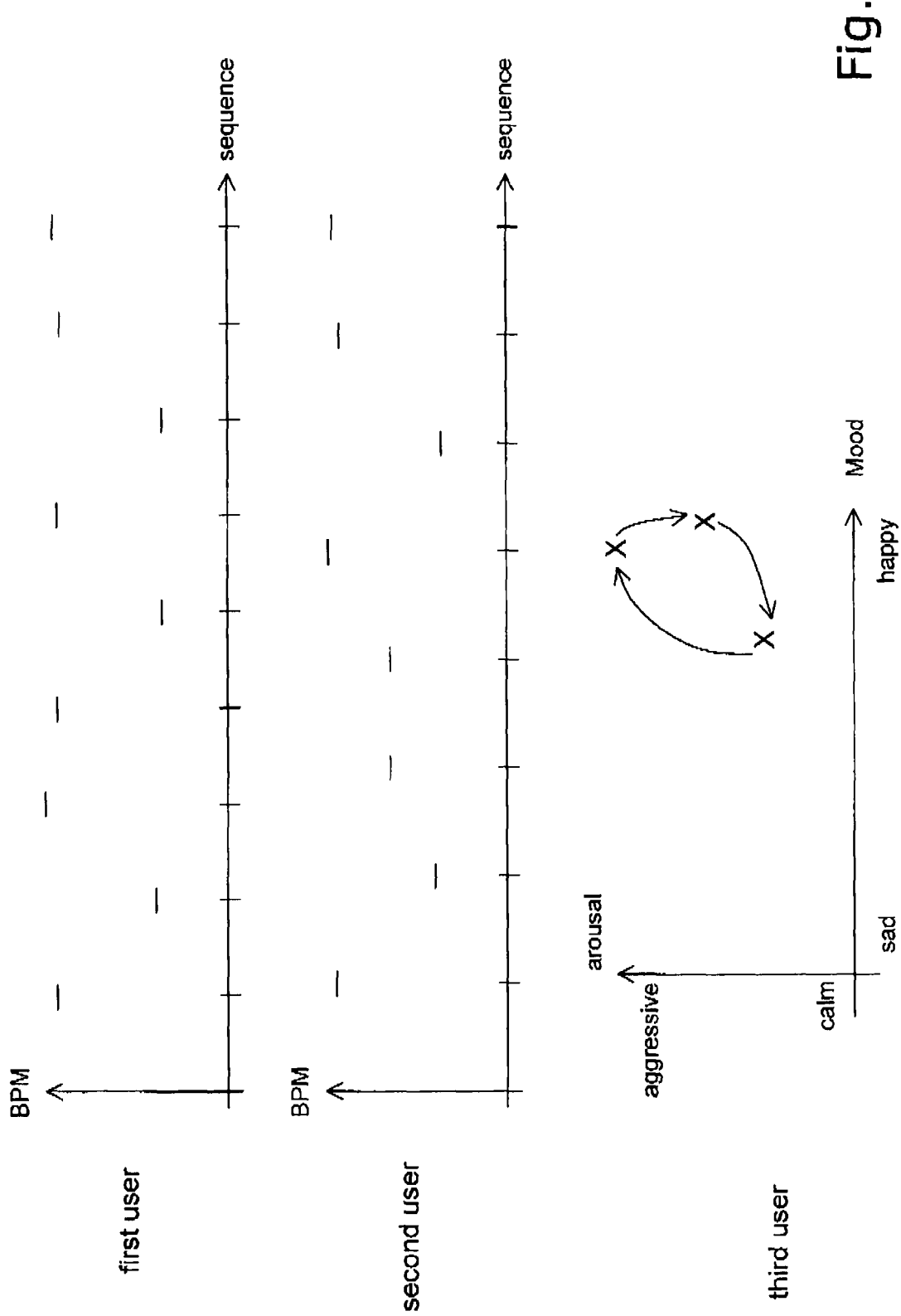
FIG. 6 illustrates rules descriptive for a user's preferences that may be included in a user's personal profile in accordance with an embodiment of the method.

In FIG. 6, different user profiles of a first, second and third user are depicted for indicating the variety of content and notation of different user profiles. The first user prefers sequences of audio pieces starting with a high average beat per minute (BPM) followed by a second piece with a low average beat per minute, then followed by two audio pieces having a high average beat per minute and then again an audio piece with a low average beat per minute. This pattern of preference is repeated, thus indicating a pattern for arranging a finite sequence (playlist) of audio pieces or an endless sequence (stream) of audio pieces.

Contrasting to this, the second user prefers starting a sequence with an audio piece having a high average beat per minute, followed by a low average beat per minute, then followed by two pieces with medium average beat per minute, which pattern is then repeated.

Thus, even if the first and second user would individually purchase a given playlist e.g. from an online music store, the playlist could be individually arranged for each of the users, resulting in a different arrangement with respect to the average beat per minute. These individual arrangements may be assumed to be particularly suited for satisfying each user's preferences.

Further, the profile of the third user is described with respect to two different attributes, e.g. the mood and the arousal of an audio piece. The profile indicates that the third user prefers sequences of a calm and rather happy song, followed by an aggressive and happy song and further followed by a happy song with medium arousal. Then, a further calm and rather happy song may again follow, initiating a further occurrence of the pattern.

Thus, while the profiles of the first and second users are described with respect to one single acoustic parameter, the profile of the third user is described with respect to two different parameters, the arousal and the mood of a song.

However, the description of user profiles and rules is not limited to these examples, and further not limited to patterns of instances of attributes. Also more complex formulations of the rules are possible. In fact, each expression, in particular automatically evaluable expression of a predicate logic may be used. For example, a user profile may include the rule that "one rock song is not enough" indicating that after a rock song being placed in the sequence, four further rock songs should follow. Another user, however, may prefer that each rock song is followed by at least three more soft ballads, requiring a cool down after each powerful song. Thus, a wide variety of descriptions of user profiles and the included rules is possible.

Figure 7:
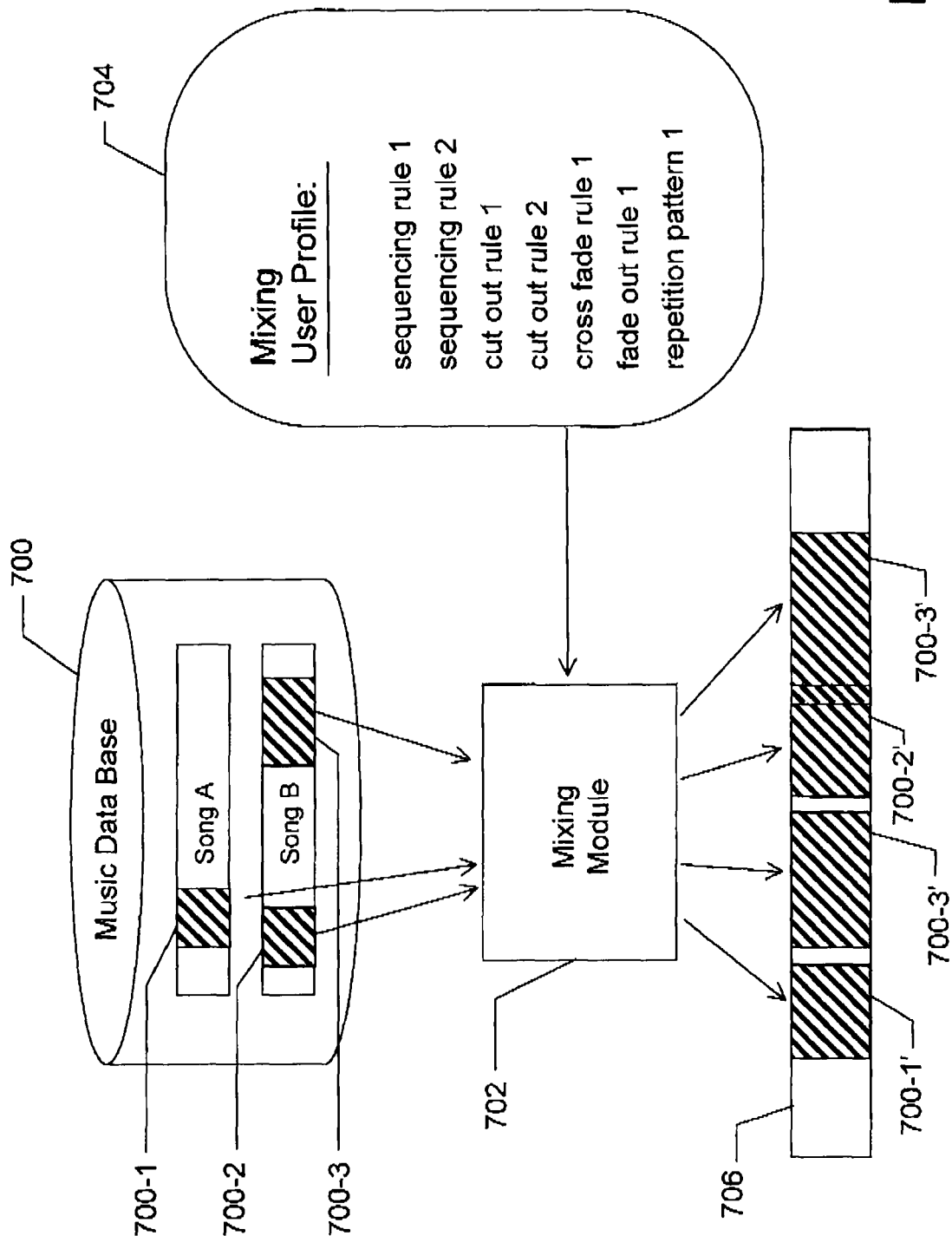
FIG. 7 illustrates a further embodiment of the method applied to mixing parts of songs in accordance with a user's preferences.

In FIG. 7, a further embodiment of the method for determining a sequence of audio pieces is illustrated. In the embodiment, each audio piece is a part of one of a set of music pieces provided by a music data base 700. In the example, music data base 700 includes two songs, song A and song B. From song A and song B, parts 700-1, 700-2 and 700-3 are selected, e.g. cut out. Thus, parts 700-1 to 700-3 are excerpts from song A and song B. These parts are provided to a mixing module 702 having access to a mixing user profile 704.

Mixing user profile 704 includes different rules for sequencing (sequencing rules 1 and 2), for cutting out (cut out rule 1 and 2) for fading (cross fade rule 1 and fade out rule 1) and for repetition (repetition pattern 1). These rules may be derived from preferred mixes stored in a user's personal collection of mixes for acquiring these rules, a corresponding method as depicted in FIG. 3 may be applied. Thus, a mixing classification algorithm may analyze mixes included in the personal collection of mixes, thereby recognizing preferred sequencing rules, cut out rules, cross fade rules or repetition patterns. For example, a sequencing rule may correspond to rule 106-1. A cut out rule 1 may prescribe to cut out the refrain of a song, while a cut out rule 2 may prescribe to cut out a typical singing voice of a song. A cross fade rule may describe rhythm adaption for obtaining a smooth transition, and a fade out rule may describe a progressive, digressive or linear fade out. A repetition pattern may be applied to a sequencing rule, e.g. in the case when the sequencing rule describes how singing voice and refrain are to be sequenced, and when the repetition pattern describes a higher order repetition of parts of sequences obtained by applying the sequencing rules.

Thus, when applying the rules of mixing user profile 704 to parts 700-1 to 700-3 by mixing module 702, a mix 706 may be obtained in which the respective audio piece, the position of the respective audio piece within the mixing order and/or a fading applied between two of the audio pieces consecutively arranged in the order are determined depending on mixing user profile 704.

Thus, complex mixes may be automatically provided on the basis of a personalized mixing profile. The cutting out of the parts may for example be identified by a song identification algorithm. Once the parts are identified, the method as described to be applied for complete songs might in this embodiment be applied to the parts. As a consequence, the generation of complex mixes based on the individual taste of the user as well as on his personal selection of preferred streams from other DJs may be obtained.

Figure 8:
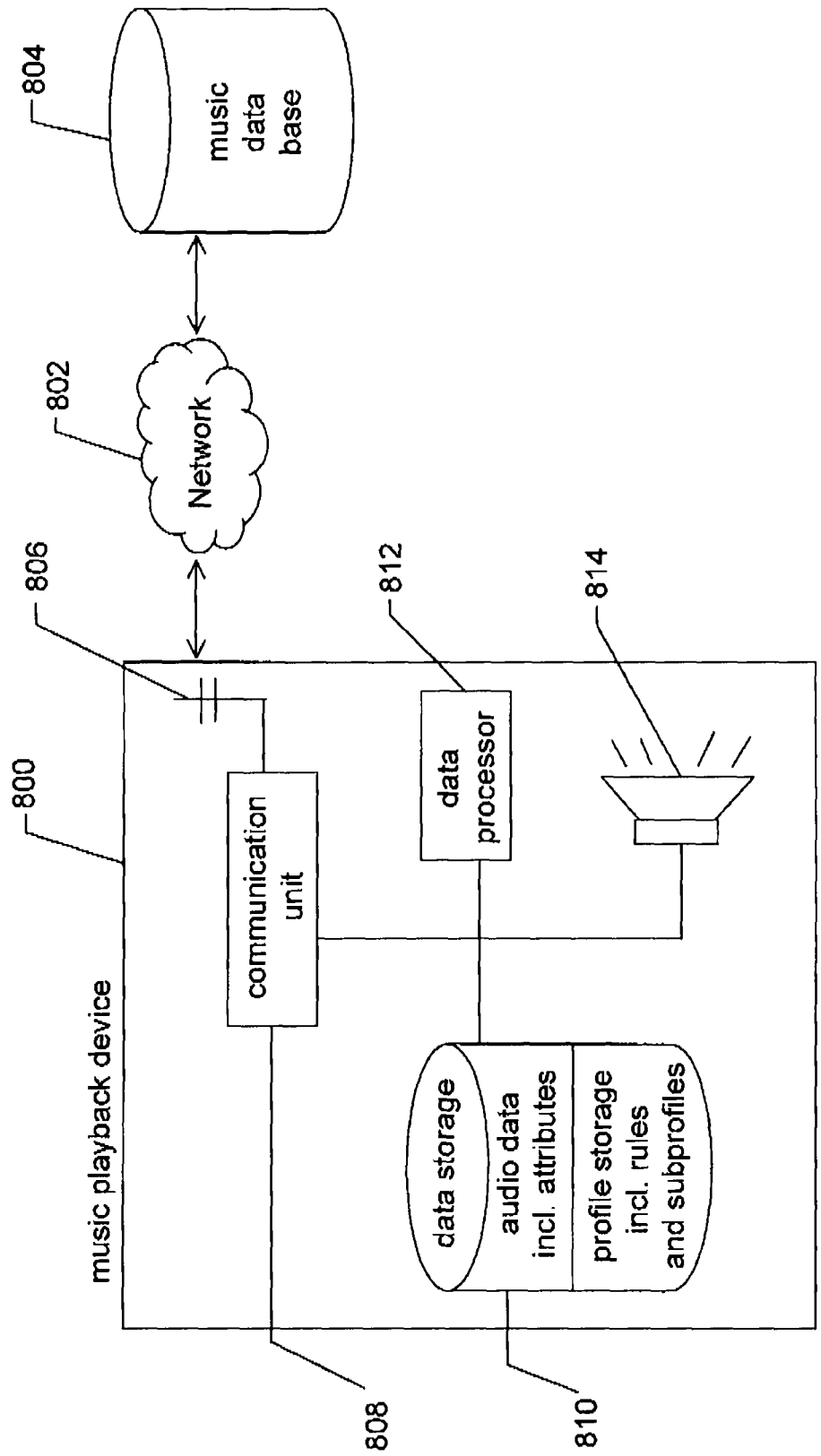
FIG. 8 illustrates a music playback device which is adapted to arrange audio pieces obtained over a network from a music database in accordance with a user's preferences.

In FIG. 8, an embodiment of a music playback device 800 is illustrated. Music playback device 800 may correspond to a portable music device such as an MP3 player, a personal digital assistant, a portable compact disc player or a walkman™.

Music playback device 800 may have access, over a network 802, to a remote music database 804 accessible e.g. via internet. For communicating via network 802, music playback device 800 may further include an antenna 806 and a communication unit 808.

Further, music playback device 800 may include a data storage 810 adapted to store a set of audio pieces and attributes of the audio pieces including meta data attributes and/or acoustic parameters. Further, data storage 810 may include a profile storage for storing a user's personal profile including rules descriptive for the user's preferences, the rules relating to the attributes. Thus, the profile storage may be adapted to store a user profile corresponding to user profile 106.

Further, music playback device 800 may include data processor 812, which may be adapted to determine a sequence of audio pieces by arranging the audio pieces in an order. The position of a respective audio piece within the order may be determined based on the user's personal profile, as has been described in the above. Thus, the position of a respective audio piece is determined depending on the respective attribute of the respective audio piece and further determined in accordance with one of the rules of the user's personal profile. Thus, music playback device 800 is adapted to arrange any set of audio pieces, e.g. from data storage 810 or obtained via network 802 from music data base 804, into an order depending on the user profile as stored in the profile storage, i.e. depending on the attributes assigned to the audio pieces and in accordance with the rules of the personal profile.

Further, music playback device includes a loudspeaker 814 for outputting the determined sequence to the user.

In a further embodiment of music playback device 800, communication unit 808 may also be configured to request and/or receive the audio pieces, the attributes of the audio pieces, and/or further rules to be used for determining the user's personal profile.

Thus, if music database 804 includes a server, the server holding music database 804 including the set of audio pieces and/or the attributes of the audio pieces of the set, and if further the server includes a communication unit adapted to transmit content of music data base 804 to music playback device 800, music database 804 and music playback device 800 form a system for personalized playlist arrangement.

Figure 9:
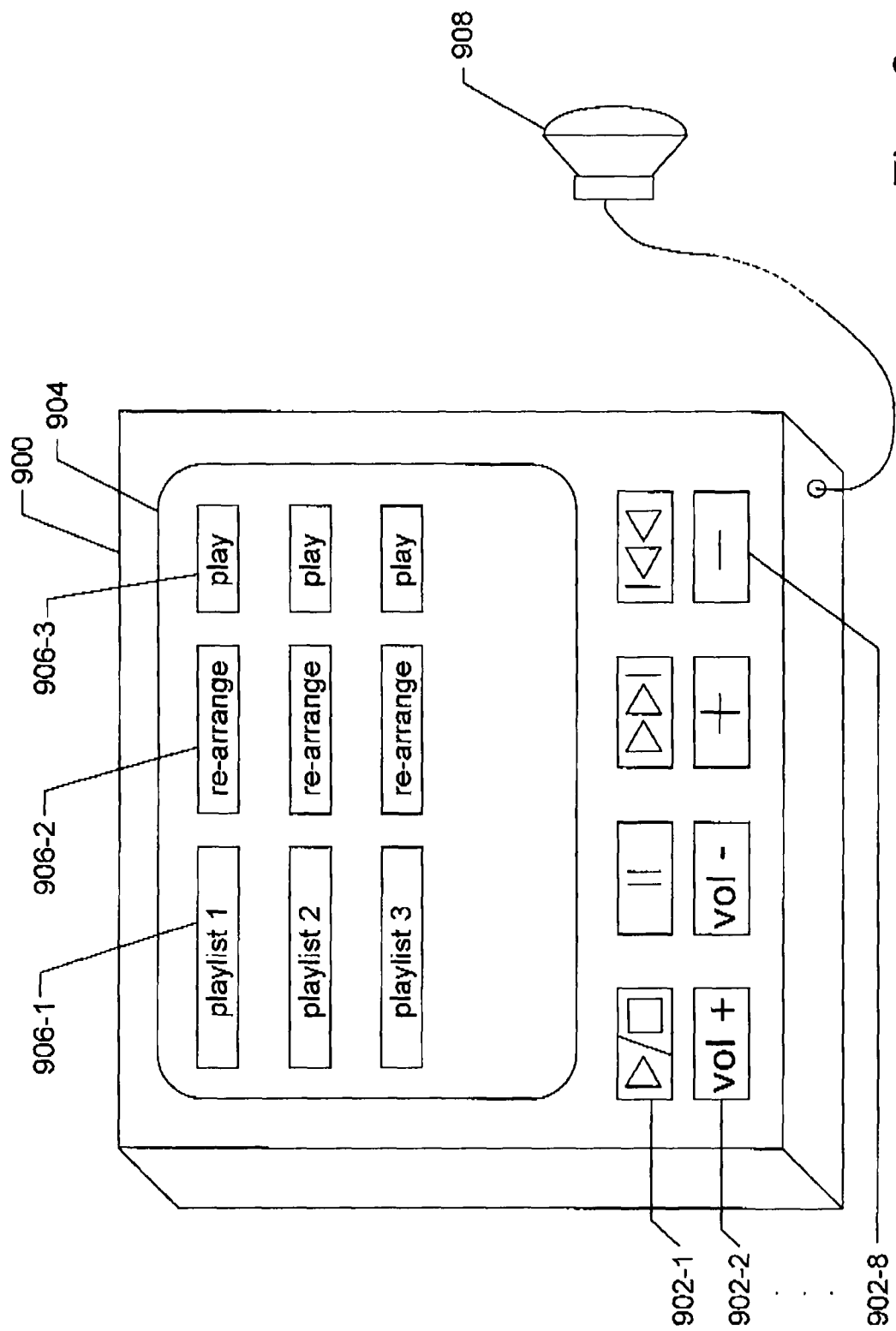
FIG. 9 illustrates a further embodiment of a music playback device for arranging sequences of audio pieces in accordance with the user's preferences.

In FIG. 9, a further music playback device 900 in form of a personal digital assistant is illustrated. Further music playback device 900 includes keys 902-1, 902-2, . . . 902-8 for enabling a user to quickly enter commands concerning a music playback. Further keys providing further functionality may also be included (not shown). Additionally, a display 904 is included for providing an overview on playlists 1 to 3 which are accessible via further music playback device 900, e.g. since being stored in a music data storage or since being accessible via network. For example, a first playlist 906-1 may be accessible, and a rearrangement button 906-2 as well as a play-back button 906-3 are presented to the user, enabling him/her to rearrange first playlist 906-1 in an order in accordance with the his/her personal profile as e.g. stored in a profile storage.

Alternatively or additionally, also a mixing button could be presented to the user, enabling the user to request an automatic mixing of songs included in first playlist 906-1 in accordance with mixing rules as for example depicted in FIG. 6.

The result of the rearrangement or mixing may then be played out to a user via loudspeaker 908.

Figure 10:
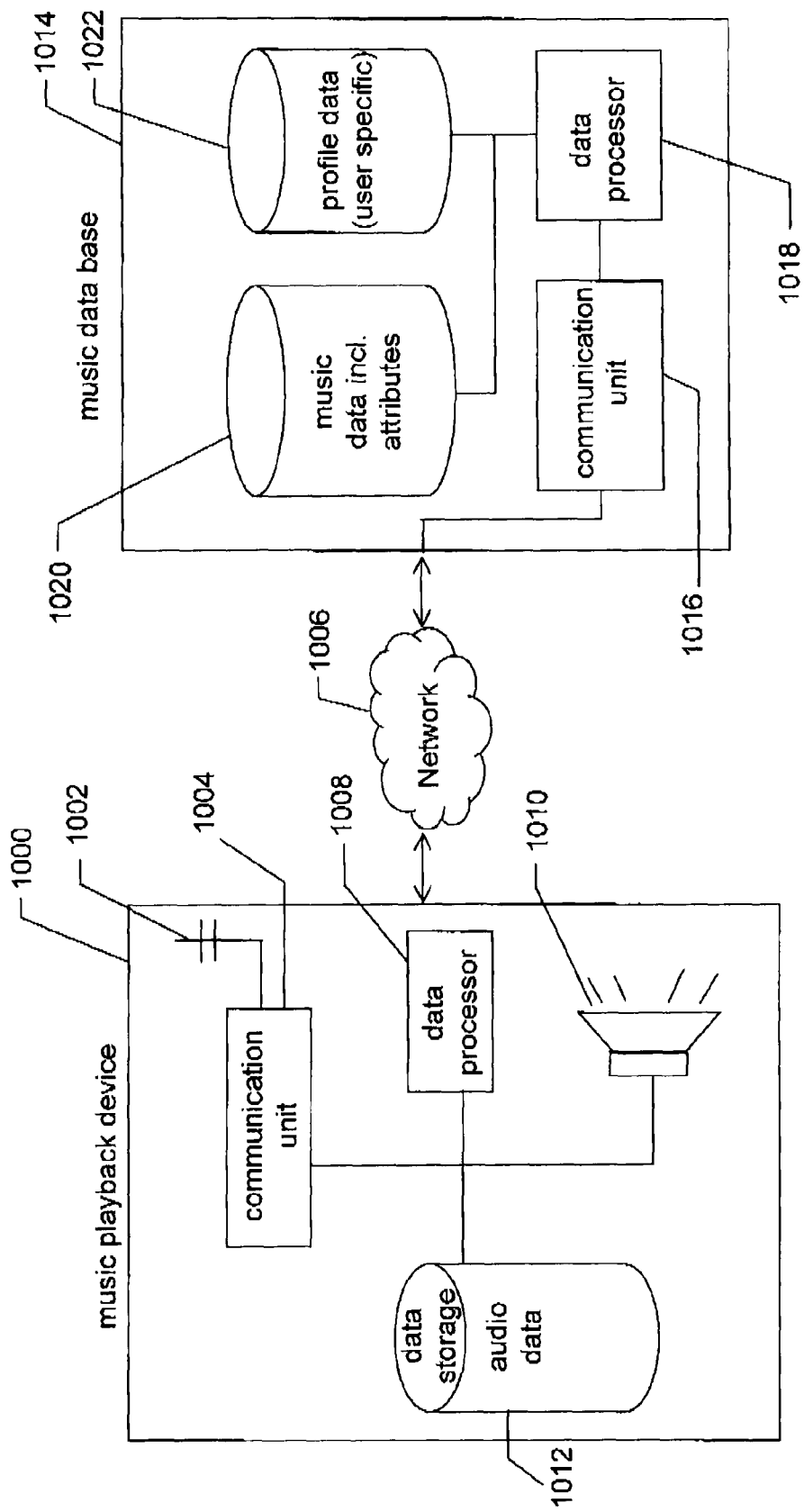
FIG. 10 illustrates a system including a music playback device having access to a music database, the system being adapted to determine a sequence of audio pieces in accordance with a user's preferences.

In FIG. 10, a further embodiment of a system for personalized playlist arrangement and/or personalized mixing is illustrated. The system includes a further music playback device 1000 corresponding to the one illustrated in FIG. 8. Thus, the further music playback device may include an antenna 1002 and a communication unit 1004 for communicating via a network 1006, and further a data processor 1008 and a loudspeaker 1010 with corresponding functionality as described for music playback device 800. Further, further music playback device 1000 may also include a data storage 1012, which in this embodiment is only adapted to store music data, i.e. audio pieces. Thus, further music playback device 1000 may have a reduced storage capacity compared to music playback device 800.

Further in the system, a further server 1014 is included. Further server 1014 may include a communication 1016 for communicating via network 1006. Communication unit 1016 may be adapted to receive a request for transmitting music data from further music playback device 1000. This request may be processed by a data processor 1018 having access to a music data storage 1020 including music data, e.g. a set of audio pieces and/or attributes including the metadata attributes and/or the acoustic parameters of the audio pieces. Further, data processor 118 may have access to a profile data storage 1022 adapted to store a personal profile of the user of further music playback device 1000, as well as other profiles of further users. Thus, the profile data may be organized in a user specific manner. The user profiles may include rules descriptive for the respective user's preferences, the rules relating to the attributes, as described in the above.

Data processor 1018 may in this embodiment be adapted to determine a sequence of audio pieces by arranging audio pieces from music data storage 1020 in an order, wherein a position of a respective audio piece within the order may be determined based on the user profile of the user of further music playback device 1000, which device has issued the request. Within the sequence, the position of the respective audio piece may thus be determined depending on the attributes of the respective audio piece and in accordance with the user profile, i.e. according to one of the rules of the user specific profile data from profile data storage 1022.

The sequence thus obtained may then be transmitted, in response to the request, by communication unit 1016 via network 1006 to further music playback device 1000, by which the sequence may be stored in data storage 1112 or played out to the user via loudspeaker 1010.

In this embodiment, storage capacity for storing the music data and the attributes, storage capacity for storing the user's personal profile and processing power needed for profile generation, music data analysis and music data arrangement are to be provided at further server 1014. Thus, at further music playback device 1000, neither large storage capacities nor a large amount of processing capacity is needed, such that this device may be kept lean and cheap, and may thus be configured as a mass product. However, providing access to the capacities and functionalities of further server 1014, further music playback device 1000 nevertheless provides functionalities allowing the user to enjoy personalized playlist arrangements and mixings as described in the above, and may therefore be of particular value for the user.

Figure 11:
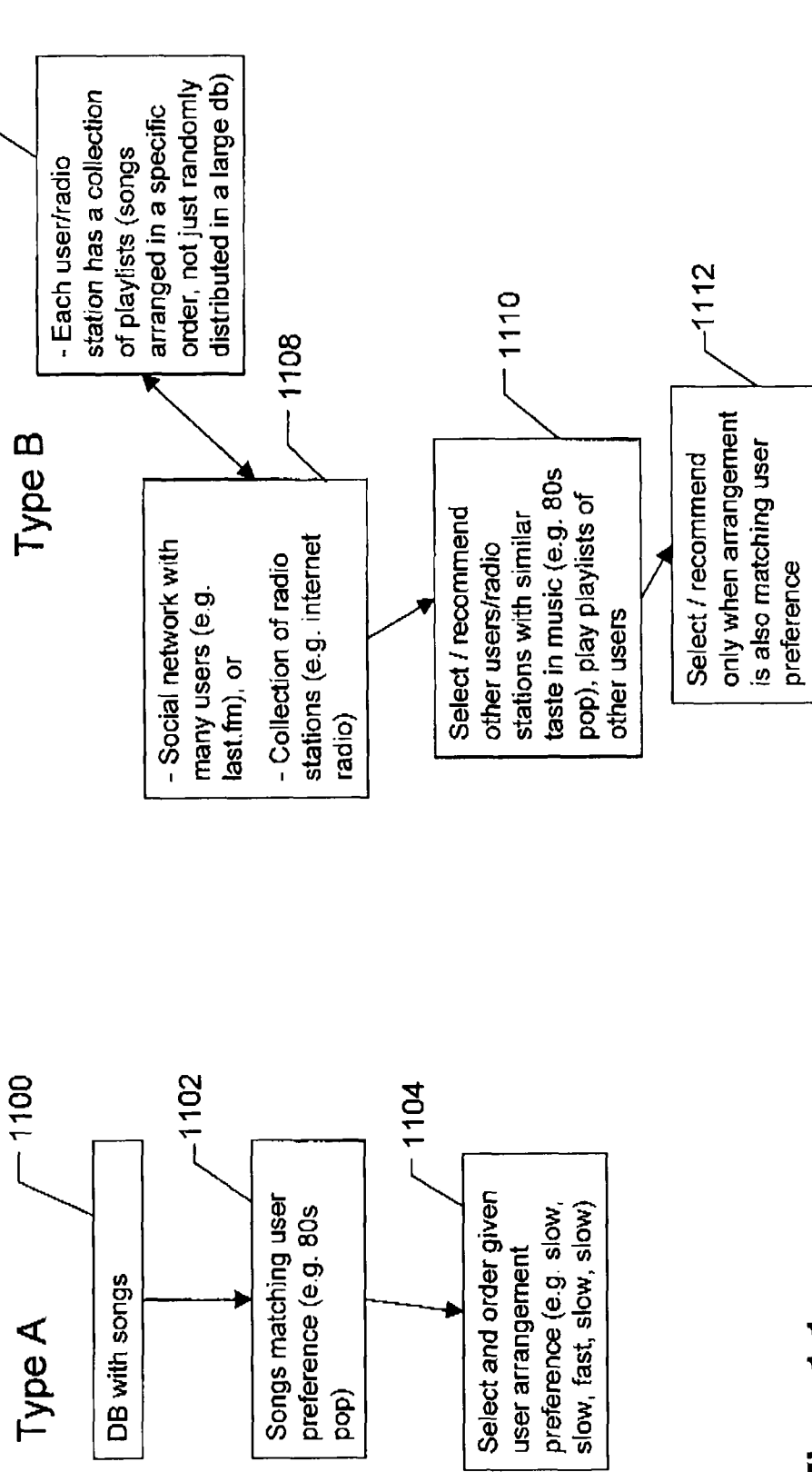
FIG. 11 illustrates two types of applications of an embodiment of the method for determining a sequence of audio pieces.

In FIG. 11, further embodiments of methods based on personalized arrangement profiles are illustrated. Two types A and B of embodiments are described.

In the embodiment of type A, a database including songs is accessed at 1100. From the database, songs matching the user's preference are selected at 1102, e.g. by using a user's personal profile describing his or her music preferences. In the case depicted, pop songs of the 80-ies are selected. At 1104, the selected songs are arranged in accordance with a user arrangement preference, e.g. a rule describing a preference pattern with respect to at least one of the attributes of the songs. In the example, a pattern "slow, slow, fast, slow, slow" is selected, and the songs are arranged such that their attributes essentially match this pattern. Thus, the embodiment of type A basically corresponds to the method illustrated e.g. in FIG. 1.

In the embodiment of type B, it is assumed at 1106 that each user or radio station has a collection of playlists or streams of songs which are arranged in a specific order. Thus, the songs are not just randomly distributed in a large database. As pointed out at 1108, this may be the case for example in a social network including many users, such as for example last.fm, or by a collection of radio stations as for example accessible at various internet sites. A user requesting to be provided with music may thus be confronted with a large amount of accessible playlists or data streams. At 1110, it is illustrated that playlists of other users or radio stations may be selected by the user or recommended to the user (only) if matching his personal taste of music. For example, if the user likes pop songs of the 80-ies, playlists of other users including such pop songs may be played to the user. At 1112, it is further illustrated that a further selection based on rules concerning the arrangement and/or order of songs is performed. As already discussed, these rules may be included in the user's personal profile. Thus, if such rules are present, it is possible to only select a playlist, stream, or radio station when the arrangement is matching the rules, i.e. is matching the user's preferences.

Correspondingly, with the method of type B, it is possible to receive a set of sequences of audio pieces, each of the sequences of the set including audio pieces arranged in a predefined order. Further, it is possible to determine a respective degree of match between a user's personal profile, i.e. corresponding to user profile 106, and a respective sequence of the set. As a result, it is possible to select one of the sequence of the set according to the respective degree of match of this sequence, i.e. if the respective degree of match exceeds a predefined threshold.

The respective degree of match between the user's personal profile and the respective sequence may for example be determined depending on a compliance between the attributes of the audio pieces arranged within the respective sequence and at least one of the rules. For example, if one of the rules describes a preference of the user liking sequences following the pattern "slow, slow, fast", the average beats per minute of the audio pieces arranged within a respective sequence may be analyzed, and a sum of squares of the differences of these average beats per minute with respect to the attributes slow or fast with corresponding ranges may be determined and used for numerically evaluating the compliance. Thus, a stream having for example a minimum sum of squares may be selected or recommended to the user.

Figure 12:
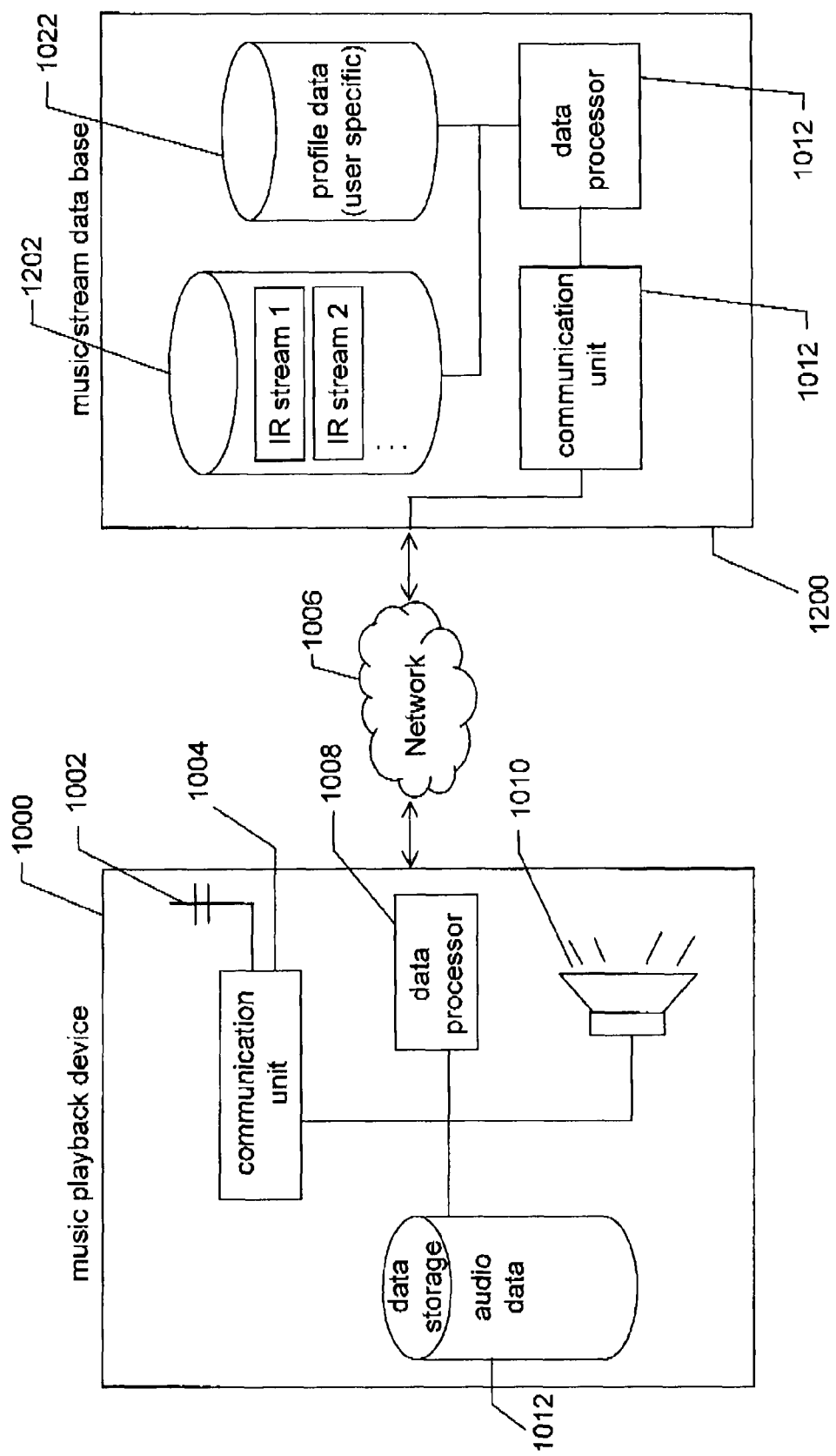
FIG. 12 illustrates a further system for realizing the second application illustrated in FIG. 11.

In FIG. 12, a system adapted to select a sequence of audio pieces with respect to a user profile describing arrangement preferences is described. The system may for example include the further music playback device 1000 as described with respect to FIG. 10, including antenna 1002, communication unit 1004, data storage 1012, data processor 1008, and loudspeaker 1010.

Further, the system may include a music stream database 12000 accessible from music playback device 1000 via network 1006, which may largely correspond to the further server 1014. Thus, music stream database 1200 may also include communication unit 1016, data processor 1018, and profile data storage 1022 as described in the above. However, instead of music data storage 1020, music stream database 1200 includes a potentially large collection of music streams 1202, in which audio pieces are arranged in predefined sequences, e.g. following global preference rules.

Within the system, a user's request for music may be transmitted from further music playback device 1000 over network 1006 to a music stream database 1200. Upon receiving the request, data processor 1018 of music stream data base 1200 may retrieve a corresponding user profile from profile data storage 1027, and then analyze streams included in collection of streams 1202 with respect to rules of the user profile.

In a first step, it is for example possible to select streams including audio pieces matching the musical preferences of the user, these streams forming a subset of collection of music streams 1202.

In a second step, from this subset, streams may be selected which essentially match a sequencing rule of the user profile, e.g. corresponding to rule 106-1. For example, a stream having a highest compliance between the attributes of the included audio pieces with the sequencing rule may be selected.

As already described, the stream having the highest compliance may be determined by calculating a respective sum of square of the differences between the attributes of the audio pieces arranged within the stream and the sequencing rule for each stream of the subset, and by selecting the stream having the least sum of squares as the stream having the highest compliance.

This stream may thus be transmitted from music stream database 1200 to further music playback device 1000 of the user. Thus, it may be assured that not only the content of the stream, but also the order of arrangement of the stream pleases the user, further satisfying the user's needs.

The invention claimed is:

1. A method for determining a sequence of audio pieces, comprising:
   receiving a set of audio pieces; and
   determining, by a data processor, the sequence of audio pieces by arranging audio pieces from the set in an order;
   wherein
   a position of a respective audio piece within the order is determined based on a user's personal profile,
   the user's personal profile includes rules descriptive of the user's preferences, the rules relating to attributes including meta data information and/or acoustic parameters of audio pieces,
   the user's personal profile includes rules generated from at least one of a collection of personal playlists of the user and a global profile downloaded from a profile server when the user's personal profile is empty, and wherein
   the position of the respective audio piece is determined depending on one of the attributes of the respective audio piece according to one of the rules.

2. The method according to claim 1, wherein
   one of the rules includes a first pattern of the attributes, the first pattern being preferred by the user, and wherein
   the audio pieces from the set are arranged such that the attributes of the arranged audio pieces form a second pattern essentially matching the first pattern.

3. The method according to claim 1, wherein
   the collection includes at least one sequence of audio pieces, the user's personal profile being generated by analyzing the attributes of the audio pieces arranged within the at least one sequence of audio pieces of the personal collection.

4. The method according to claim 3, wherein the user's personal profile includes a rule including a third pattern of the attributes, the third pattern having been determined by an algorithm of pattern recognition classifying patterns of the attributes of the personal playlists included in the collection.

5. The method according to claim 3, wherein
   the user's personal profile is determined by adapting the global profile and amending the global profile based on the at least one sequence of audio pieces from the personal collection of the user.

6. The method according to claim 1, wherein
the user's personal profile includes sub-profiles relating to a mood of the user, an activity of the user, a situation surrounding the user, a time of day, and/or a user's desired type of music.

7. The method according to claim 1, wherein
a further user having a personal profile matching the user's personal profile is determined, and wherein the sequence of audio pieces is determined with respect to a further sequence of audio pieces from a personal collection of the further user.

8. The method according to claim 1, wherein
each audio piece is a part of one of a set of music pieces, and wherein
the respective audio piece, the position of the respective audio piece within the order and/or a fading applied between two of the audio pieces consecutively arranged in the order is determined depending on the user's personal profile.

9. The method according to claim 1, wherein
the meta data information include an artist, a song name, a genre, a mood, an instrumentation and/or a type of section.

10. The method according to claim 1, wherein
the acoustic parameters include a beat per minute, a volume and/or a frequency spectrum.

11. A music playback device, including comprising:
a data storage configured to store a set of audio pieces, attributes of the audio pieces including meta data information and/or acoustic parameters, a user's personal profile including rules descriptive of the user's preferences, the rules relating to the attributes, and further the rules being generated from at least one of a collection of personal playlists of the user and a global profile downloaded from a profile server when the user's personal profile is empty ;
a data processor configured to determine a sequence by arranging audio pieces from the set in an order, wherein a position of a respective audio piece within the order is determined based on the user's personal profile, the position of the respective audio piece being determined depending on a respective attribute of the respective audio piece according to one of the rules; and
a speaker configured to output the determined sequence.

12. The music playback device according to claim 11, further including:
a communication unit configured to receive the set of audio pieces, the attributes of the audio pieces included in the set, and/or rules to be used for determining the user's personal profile.

13. A system including:
a music playback device according to claim 12; and
a server including
a music data base including the set of audio pieces and/or the attributes of the audio pieces of the set, and
a communication unit configured to transmit content of the music data base to the music playback device.

14. The music playback device according to claim 11, wherein the collection includes at least one sequence of audio pieces, the user's personal profile being generated by analyzing the attributes of the audio pieces arranged within the at least one sequence of audio pieces of the personal collection.

15. The music playback device according to claim 11, wherein the collection includes at least one sequence of audio pieces, the user's personal profile being generated by analyzing the attributes of the audio pieces arranged within the at least one sequence of audio pieces of the personal collection, and wherein the user's personal profile is determined by adapting the global profile and amending the global profile based on the at least one sequence of audio pieces from the personal collection of the user.

16. A system including:
a server including
a communication unit configured to receive a user's request and configured to transmit a sequence of audio pieces,
a music data base including a set of audio pieces and/or attributes including meta data information and/or acoustical parameters of the audio pieces of the set,
a data storage configured to store a personal profile of the user including rules descriptive of the user's preferences, the rules relating to the attributes, the rules being generated from at least one of a collection of personal playlists of the user and a global profile downloaded from a profile server when the user's personal profile is empty, and
a data processor configured to determine the sequence of audio pieces by arranging audio pieces from the set included in the music data base in an order, wherein a position of a respective audio piece within the order is determined based on the user's personal profile, the position of the respective audio piece being determined depending on the attributes of the respective audio piece according to one of the rules; and
a music playback device, including
a communication unit configured to transmit the user's request and configured to receive the sequence of audio pieces;
a data storage configured to store the sequence of audio pieces; and
a speaker configured to output the sequence of audio pieces.

17. The system according to claim 16, wherein the collection includes at least one sequence of audio pieces, the user's personal profile being generated by analyzing the attributes of the audio pieces arranged within the at least one sequence of audio pieces of the personal collection.

18. The system according to claim 16, wherein the collection includes at least one sequence of audio pieces, the user's personal profile being generated by analyzing the attributes of the audio pieces arranged within the at least one sequence of audio pieces of the personal collection, and wherein the user's personal profile is determined by adapting the global profile and amending the global profile based on the at least one sequence of audio pieces from the personal collection of the user.

19. A method for selecting a sequence of audio pieces, comprising:
receiving a set of sequences of audio pieces, each of the sequences of the set including audio pieces arranged in an order,
determining, by a data processor, a respective degree of match between a user's personal profile and a respective sequence of the set, and
selecting one of the sequences of the set according to the respective degree of match; wherein
the user's personal profile includes rules descriptive of the user's preferences, the rules relating to attributes including meta data information and/or acoustic parameters of audio pieces, the rules being generated from at least one of a collection of personal playlists of the user and a global profile downloaded from a profile server when the user's personal profile is empty, and wherein the respective degree of match between the user's personal profile and the respective sequence is determined depending on a compliance between the attributes of the audio pieces arranged within the respective sequence and at least one of the rules.

20. A system including:
a server including:
- a communication unit configured to receive a user's request and configured to transmit a selected sequence of audio pieces to the user,
- a music data base including a set of sequences of audio pieces, each sequence including audio pieces arranged in an order, and further including attributes including meta data information and/or acoustical parameters of the audio pieces,
- a data storage configured to store a personal profile of the user including rules descriptive of the user's preferences, the rules relating to the attributes, the rules being generated from at least one of a collection of personal playlists of the user and a global profile downloaded from a profile server when the user's personal profile is empty,
- a data processor configured to determine a respective degree of match between a respective sequence of the set and the user's personal profile, and further configured to select one of the sequences of the set in accordance with the respective degree of match of the one of the sequences, the respective degree of match being determined depending on a compliance between the attributes of the respective sequence and at least one of the rules, the selected sequence being transmitted by the communication unit; and a music playback device, including
- a communication unit configured to transmit the user's request and adapted to receive the selected sequence; and
- a speaker configured to output the selected sequence.

* * * * *